United States Patent Office 3,403,124
Patented Sept. 24, 1968

3,403,124
PETROLEUM RESINS LIGHT AND HEAT-STA-
BILIZED WITH FATTY ACID ESTER OF 4-
HYDROXYETHYL - 2,6-DITERTIARY BUTYL
PHENOL
Neville Leverne Cull, Baker, La., assignor to Esso
Research and Engineering Company, a corpora-
tion of Delaware
No Drawing. Filed July 16, 1965, Ser. No. 472,667
8 Claims. (Cl. 260—29.7)

ABSTRACT OF THE DISCLOSURE

The color of petroleum resins is stabilized by the addition of .05 to 0.5 wt. percent of a fatty acid ester of 4-hydroxyethyl-2,6-ditertiary butyl phenol (e.g. the stearic acid ester) with or without 0.1 to 1.0 wt. percent of 2-hydroxy-4-n-octoxybenzophenone.

---

This invention relates to a method for the improvement of the light and color stability of hydrogenated petroleum resins.

It is known to prepare low-colored resins by polymerizing steam-cracked petroleum fractions with Friedel-Crafts catalysts and hydrogenating the resulting resin in the presence of a hydrogenation catalyst. However, it has been found difficult to obtain a color-stable product by this method due to the presence of residual unsaturation present in the hydrogenated product which reacts with oxygen of the atmosphere as the result of thermal and electromagnetic radiation reactions.

In accordance with the present invention it has been discovered that the tendency of the hydrogenated resin to degrade in color on standing due to thermal and electromagnetic effects can be overcome by the addition of small amounts of 2 hydroxy-4-n-octoxy benzophenone and the stearic acid ester of 4-hydroxyethyl-2,6-ditertiary butyl phenol.

The base resin which is to be hydrogenated and stabilized in accordance with the present invention is prepared from certain unsaturated petroleum refinery streams which contain various mixtures of acyclic and cyclic olefins and diolefins by contact with a Friedel-Crafts type catalyst under relatively low temperatures, e.g. $-150°$ to $+200°$ F. The hydrocrabon mixtures obtained by steam cracking petroleum oils have been found to be especially useful for this purpose. These distillates are prepared by cracking petroleum fractions such as kerosene, gas, oil, naphtha or residua in the presence of large amounts of steam, e.g. 50 to 90 mole percent, at temperatures of approximately 1,000 to 1,600° F. This steam cracking process is well known in the patented art and literature. The cracked liquid fraction ordinarily contains small amounts of cyclopentadiene monomers which are usually at least partially removed by thermal treatment of the fraction to cause dimerization of the cyclodiene. The cyclodienes may be left in the fraction if it is desired. These resins are useful for the preparation of floor tiles, in paints, for varnish manufacture or the like. In general, various steam cracked hydrocarbon streams such as described above and more particularly below may be employed. For example, a resin may be prepared from feed stocks having a relatively wide boiling range, e.g. 10° to 230° C., preferably 20 to 220° C., from which essentially all of the $C_4$ hydrocarbons and lighter hydrocarbons have been removed, although one may also use one or more narrower fractions such as the 40° to 150° C. fraction, the 150° to 230° C. fraction, etc. It is also sometimes advantageous to remove the isoprene from the naphtha. Typical analyses of such a wide steam cracked boiling fraction are shown in the following table:

TABLE I
[Steam Cracked Naphtha Fraction Boiling Between 10° and 230° C.]

| Component | Approximate Boiling Range, °C. | Specific Example, vol. percent | General Range (15–70° C.), vol. percent |
|---|---|---|---|
| $C_5$ Fraction | 10 to 65 | 31 | 10 to 40. |
| $C_6$–$C_8$ Fraction | 65 to 150 | 64 | 30 to 70. |
| $C_9$–$C_{12}$ Fraction | 150 to 230 | 5 | 0 to 25. |

Although the actual content of various chemical classes of hydrocarbons present may vary somewhat according to the type of crude oil from which the gas-oil fraction is being cracked and according to the steam cracking conditions and fractionating conditions; nevertheless, in general, a desirable, essentially debutanized, steam-cracked naphtha fraction boiling between 50° and 450° F. will have approximately the following range in composition:

Percent by wt.
Aromatic hydrocarbons _____ 10–50
Olefins _____ 30–70
Unreactive paraffins _____ 0–5

A typical sample of such a fraction will consist essentially of about 5 to 20 weight percent benzene, about 5 to 15 weight percent toluene, about 0 to 25 weight percent of $C_9$ to $C_{12}$ aromatic hydrocarbons, about 5 to 15 weight percent of cyclodienes, about 10 to 15 weight percent aliphatic diolefins, about 15 to 60 weight percent of mono-olefins and about 0 to 5 weight percent unreactive paraffins.

Any of the above fractions are converted into resin by polymerization in the presence of a Friedel-Crafts catalyst, such as $AlCl_3$, $BF_3$, $SnCl_4$, $TiCl_4$, $AlBr_3$, etc. at a temperature of about $-150°$ F. to $+200°$ F., preferably 70 to 130° F. The resin thus produced becomes the feed to the second step of the process. In this step the resin is hydrogenated in the presence of a catalyst and a solvent.

Suitable solvents for use in the hydrogenation step include n-hexane and its various isomers, n-heptane, and the like.

Suitable hydrogenation catalysts include metals of Groups VI and VIII of the Periodic Table, e.g. nickel, palladium, platinum, nickel sulfides, copper chromite, cobalt molybdate, etc. which may be supported on light porous or other granular particles such as alumina, pumice, clay, charcoal, etc.

The hydrogenation is effected in a continuous process under a pressure of about 100 to 5000 p.s.i.g., preferably about 500 to 3000 p.s.i.g., at temperatures of 100 to 750° F., preferably about 300 to 500° F., under a hydrogen flow rate of about 100 to 2000 standard cubic feet per barrel of resin with a liquid feed rate of 0.1 to 5, preferably 0.3 to 2 v./v./hr., i.e. volumes of liquid feed per volume of catalyst per hour. The resins thus obtained have a molecular weight of approximately 500 to 2000, a ball and ring softening point of about 70 to 105° C. or higher and an an iodine number below 100.

In accordance with the present invention the hydrogenated resin thus produced is made color stable to heat and electromagnetic radiation such as visible light and ultraviolet light by the addition to the hydrogenated resin of 0.1 to 1 wt. percent of 2-hydroxy 4-n-octoxybenzo-phenone and .05 to 0.5 wt. percent of a saturated fatty acid ester of 4-hydroxyethyl-2,6-ditertiary butyl phenol, such as the butyric, isovaleric, caproic, capric, lauric, myristic, palmitic, stearic, arachidic, behenic, lignoceric and cerotic fatty acid esters. The advantages of this invention are obtained even when the resin is admixed with other compositions, e.g. latices of mixtures of 30 to 90 wt. percent of hydrogenated petroleum resins and 70 to 10 wt. percent of butyl rubber such as described in Ser. No. 211,398, filed July 20, 1962 and incorporated herein by reference.

The details and advantages of the present invention will be better understood from a consideration of the following examples.

Example 1

Samples of hydrogenated petroleum resin prepared as described above and having a S.P. of 73° C., a mole percent unsaturation of 0.77%, a bromine number of 1.2 and a Gardner color of 1 was treated separately with .2 wt. percent of various antioxidants. The thermal stability was then determined by heating a 5.0 gram sample of the resin in 100 ml. beakers for fifteen hours at 125° C. Gardner colors of a 50% solution of the resin in toluene were measured before and after the thermal treatment.

| Sample | Antioxidant | Gardner Color Initial | Gardner Color Final | Δ Gardner |
|---|---|---|---|---|
| 1 | A | 1.0 | 5.0 | 4 |
| 2 | B | | 7.0 | 6 |
| 3 | C | 1.0 | 3.0 | 2 |
| 4 | None | 1.0 | 7.0 | 6 |

Antioxidants;
A = 2,2'-methylene bis-4-methyl para cresol.
B = N-lauroyl para-aminophenol.
C = Stearic acid ester of 4 hydroxyethyl-2,6-ditertiary butyl phenol.

The above data show that antioxidant C (stearic acid ester of 4-hydroxyethyl-2,6-ditertiary butyl phenol) affords the best protection against color degradation due to heat over two other commercial antioxidants.

Example 2

A hydrogenated petroleum resin (S.P. 96° C., bromine No. 6.4, Gardner color 1.5) was mixed with 0.1 and .05 wt. percent of 2,6-ditertiary butyl para cresol (D) and the stearic acid ester of 4-hydroxyethyl-2,6-ditertiary butyl phenol (C). The heat stability was then measured as in Example 1. The data show the stearic acid ester to be more effective at both .05 and .1 weight percent than the cresol.

| Sample | 1 | 2 | 3 | 4 | 5 |
|---|---|---|---|---|---|
| Antioxidant | None | D | D | C | C |
| Weight percent | | .1 | .05 | .10 | .05 |
| Gardner color | 12 | 8 | 11 | 6.5 | 9.5 |

Example 3

Latices were prepared from a 60/40 hydrogenated petroleum resin/butyl cement using 5.0 phr. of the sodium salt of the sulfate ester of nonylphenoxy poly-(ethyleneoxy) ethanol as emulsifier. Antioxidants (.3 phr.) were added and the color stability of the cast film studied by aging one week at 150° F. The following data were obtained.

Antioxidant:     Color stability (resin/butyl)
None _____ Poor.
E _____ Fair-poor.
A _____ Poor.
B _____ Poor.
C _____ Good-excellent.

A = 2,2'-methylene bis-4-methyl-6-tertiary butyl phenol.
B = N-lauroyl-para-aminophenol.
C = Stearic acid ester of 4-hydroxyethyl-2,6-ditertiary butyl phenol.
E = Zinc dibutyl thiocarbamate.

The above data show that antioxidant C (stearic acid ester of 4-hydroxyethyl-2,6-ditertiary butyl phenol) is vastly superior to three other commercial antioxidants in preventing color degradation of films of mixtures of latices of petroleum resins and butyl rubber.

Example 4

Although excellent thermal color stability was achieved by addition of the stearic acid ester of 4-hydroxyethyl-2,6-ditertiary butyl phenol (antioxidant C) it (nor any of the other antioxidants) did not reduce crazing of the films under exposure to ultraviolet or other electromagnetic waves. A combination of antioxidant C and 0.6 phr. of 2-hydroxy-4-normal octoxybenzophenone gave excellent thermal stability and largely eliminated crazing of gum films exposed to the fadeometer. Data are shown below for films of a hydrogenated resin butyl rubber latex containing 60 parts by weight of hydrogenated resin and 40 parts by weight of butyl rubber.

| Sample | 1 | 2 | 3 |
|---|---|---|---|
| Antioxidant | | C (.3 phr.) | |
| Light Stabilizer | None | 2-hydroxy-4-n-octoxy-benzophenone (.6 phr.). | .6 phr. 2,4-dihydroxy benzophenone. |
| Heat Aging Stability | | Good-Excellent | |
| Fadeometer aging (1 week). | Crazed badly. | Very slight crazing. | Extensive crazing. |

The above data show that the combination of the stearic acid ester of 4-hydroxyethyl-2,6-ditertiary butyl phenol and 2-hydroxy-4-n-octoxy benzophenone improves the color stability and the ultraviolet light stability of gum films of latices of mixtures of petroleum resin and butyl rubber.

Example 5

Separate 5 gram samples of hydrogenated petroleum resin (S.P. 96° C., bromine No. 6.4, Gardner color 1.5) were mixed with (a) 2,6-ditertiary butyl para cresol (antioxidant D) and (b) the stearic acid ester of 4-hydroxyethyl-2,6-ditertiary butyl phenol (antioxidant C) and heated fifteen hours at 284° F. The Gardner colors were measured on 50% solutions of the resin in toluene before and after the heat treatment.

| Sample | 1 | 2 | 3 | 4 | 5 |
|---|---|---|---|---|---|
| Antioxidant | D | D | C | C | None |
| Antioxidant, wt. percent | .2 | .1 | .2 | .1 | |
| Gardner Color after heating | 12 | [1] 14 | 9.5 | 10.5 | 12.5 |

[1] Considerable insoluble material dark brown in color.

The data show that antioxidant C (stearic acid ester of 4-hydroxyethyl-2,6-ditertiary butyl phenol) is far superior to 2,6-ditertiary butyl para cresol after aging for fifteen hours at 284° C., the latter showing no improvement over the use of no antioxidant.

The advantages of the present invention having thus been fully set forth and specific examples of the same given, what is claimed as new and useful and desired to be secured by Letters Patent is:

1. A method for maintaining the color stability in storage of a hydrocarbon resin having a molecular weight of 500 to 2000, a ball and ring softening point of 70 to 105° C. prepared by Friedel-Crafts polymerization of the unsaturates obtained by cracking of petroleum fractions which resin has been hydrogenated under pressures of 0 to 5000 p.s.i.g. at temperatures of 38 to 230° C. for a time from a few minutes up to thirty hours in the presence of a catalyst which comprises storing said resin in the presence of .05 to .5 weight percent of a saturated fatty acid ester of 4-hydroxyethyl-2,6-ditertiary butyl phenol.

2. A color stable hydrogenated hydrocarbon resin having a moelcular weight of 500 to 2000, a ring and ball softening point of 70 to 105° C. and an iodine number below 100 and containing .05 to .5 weight percent of a saturated fatty acid ester of 4-hydroxyethyl-2,6-ditertiary butyl phenol.

3. The method of claim 1 in which the fatty acid ester is a stearic acid ester of 4-hydroxyethyl-2,6-ditertiary butyl phenol.

4. The product of claim 2 in which the fatty acid ester is the stearic acid ester of 4-hydroxyethyl-2,6-ditertiary butyl phenol.

5. A method for maintaining the color and light stability in storage of a hydrocarbon resin having a molecular weight of 500 to 2000, a ball and ring softening point of 70 to 105° C. prepared by Friedel-Crafts polymerization of the unsaturates obtained by cracking of petroleum fractions which resin has been hydrogenated under pressures of 0 to 5000 p.s.i.g. at temperatures of 38 to 230° C. for a time from a few minutes up to thirty hours in the presence of a catalyst which comprises storing said resin in the presence of .1 to 1.0 weight percent of 2-hydroxy-4-n-octoxybenzophenone and 0.05 to .5 weight percent of the stearic acid ester of 4-hydroxyethyl-2,6-ditertiary butyl phenol.

6. A color and light stable hydrogenated hydrocarbon resin having a molecular weight of 500 to 2000, a ring and ball softening point of 70 to 105° C. and an iodine number below 100, and containing .1 to 1.0 weight percent of 2-hydroxy-4-n-octoxy benzophenone and .05 to .5 weight percent of the stearic acid ester of 4-hydroxyethyl-2,6-ditertiary butyl phenol.

7. An improved emulsion paint composition containing as a binder 30 to 90 weight percent of a hydrocarbon resin having a molecular weight of 900 to 1300 and a ball and ring softening point of 95 to 105° C. prepared by Friedel-Crafts polymerization of the unsaturates obtained by the cracking of petroleum fractions which resin has been hydrogenated under pressures of 0 to 5000 p.s.i.g. at temperatures of 38 to 230° C. for a time from a few minutes up to thirty hours in the presence of a catalyst and 70 to 10 weight percent (based on solids) of a latex of a rubbery butyl rubber copolymer of 85 to 99.5 weight percent of a $C_4$ to $C_7$ isoolefin and 0.5 to 15 weight percent of a $C_4$ to $C_{14}$ multiolefin containing .1 to 1.0 weight percent of a 2-hydroxy-4-n-octoxy benzophenone and .05 to .5 weight percent of the stearic acid ester of 4-hydroxyethyl-2,6-ditertiary butyl phenol.

8. The composition of claim 7 wherein said hydrocarbon resin and butyl rubber latex are employed in a weight ratio of 60/40.

References Cited
UNITED STATES PATENTS

| | | | |
|---|---|---|---|
| 2,835,650 | 5/1958 | Nelson et al. | 260—82 |
| 3,083,174 | 3/1963 | Fefer et al. | 260—82 |
| 3,116,305 | 12/1963 | Morris et al. | 260—45.85 |
| 1,362,991 | 4/1964 | Hillard et al. | 260—29.7 |
| 3,244,667 | 4/1966 | Burgess | 260—45.85 |
| 1,362,991 | 4/1964 | Hillard et al. | 260—29.7 |

MURRAY TILLMAN, *Primary Examiner.*

W. J. BRIGGS, *Assistant Examiner.*